United States Patent [19]
Troutman

[11] Patent Number: 5,940,284
[45] Date of Patent: Aug. 17, 1999

[54] LOW VOLTAGE CHARGE PUMP CIRCUIT

[75] Inventor: Bruce Lee Troutman, Meridian, Id.

[73] Assignee: Zilog, Inc., Campbell, Calif.

[21] Appl. No.: 08/993,434

[22] Filed: Dec. 18, 1997

[51] Int. Cl.⁶ .................................................. H02M 3/135
[52] U.S. Cl. ............................................................ 363/60
[58] Field of Search ....................... 363/60, 59; 323/282; 327/536

[56] References Cited

U.S. PATENT DOCUMENTS

| | | |
|---|---|---|
| 4,888,738 | 12/1989 | Wong et al. . |
| 4,929,884 | 5/1990 | Bird et al. ................................ 323/313 |
| 5,263,000 | 11/1993 | Van Buskirk et al. . |
| 5,352,936 | 10/1994 | Allen . |
| 5,612,921 | 3/1997 | Chang et al. . |
| 5,646,894 | 7/1997 | Lin et al. . |
| 5,740,109 | 4/1998 | Morton et al. ...................... 365/185.18 |

*Primary Examiner*—Adolf Deneke Berhane
*Attorney, Agent, or Firm*—Majestic, Parsons, Siebert & Hsue

[57] ABSTRACT

The present invention of a low voltage charge pump circuitry divides a charge pump circuitry into separate subsections. Each of the separate subsections is composed of a plurality of diode pump units connected in series. In addition, each of the separate subsections has its own pumper clock having different high voltage level and different frequency. A novel clock level shifter circuit is designed to provide the subsequent subsection a clock signal having the elevated high voltage level.

44 Claims, 8 Drawing Sheets

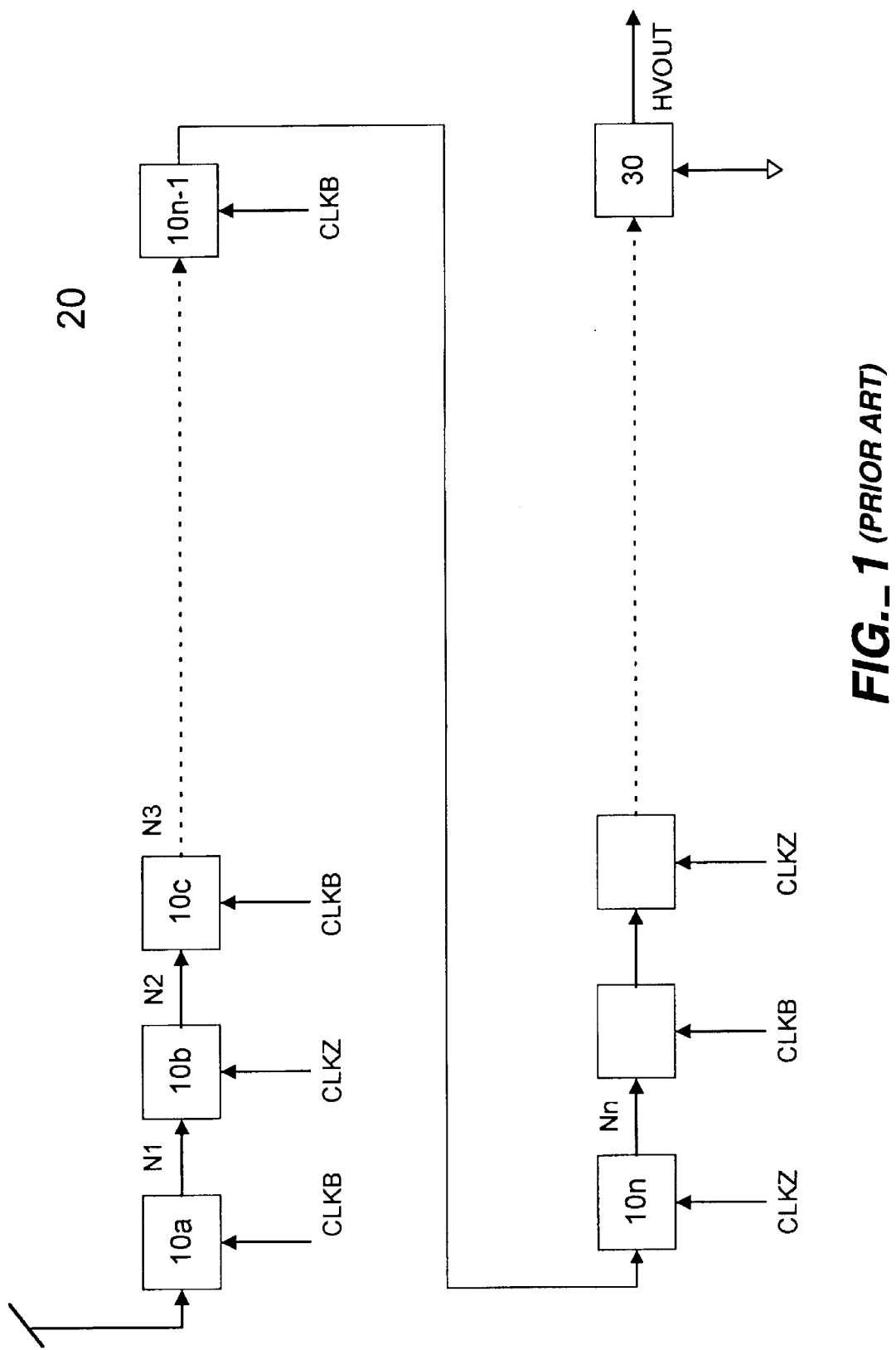
FIG._1 (PRIOR ART)

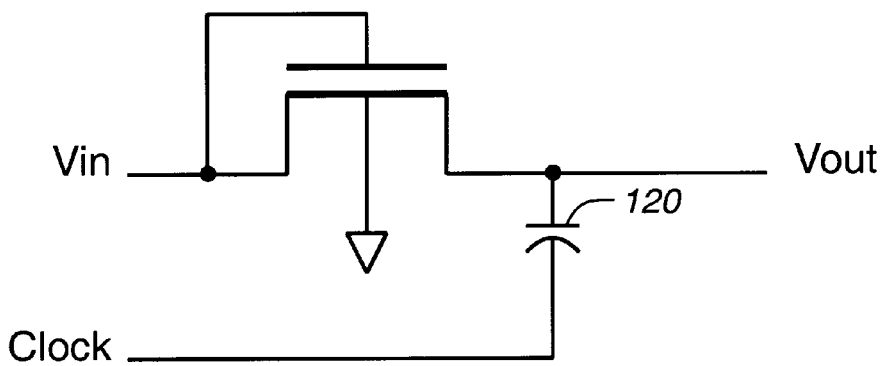
FIG._2
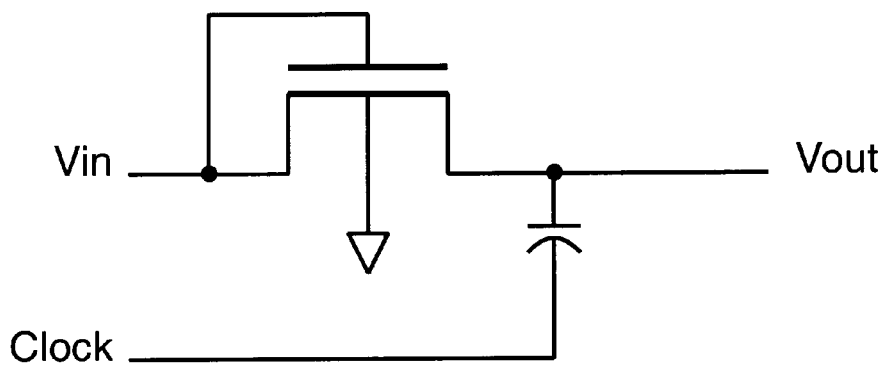
FIG._6
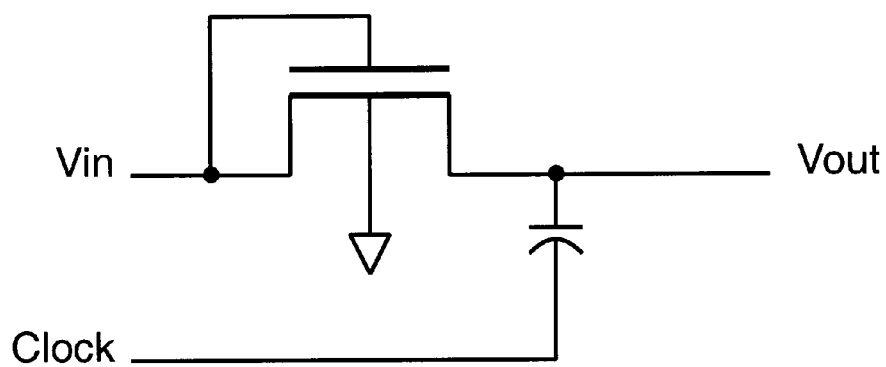
FIG._9

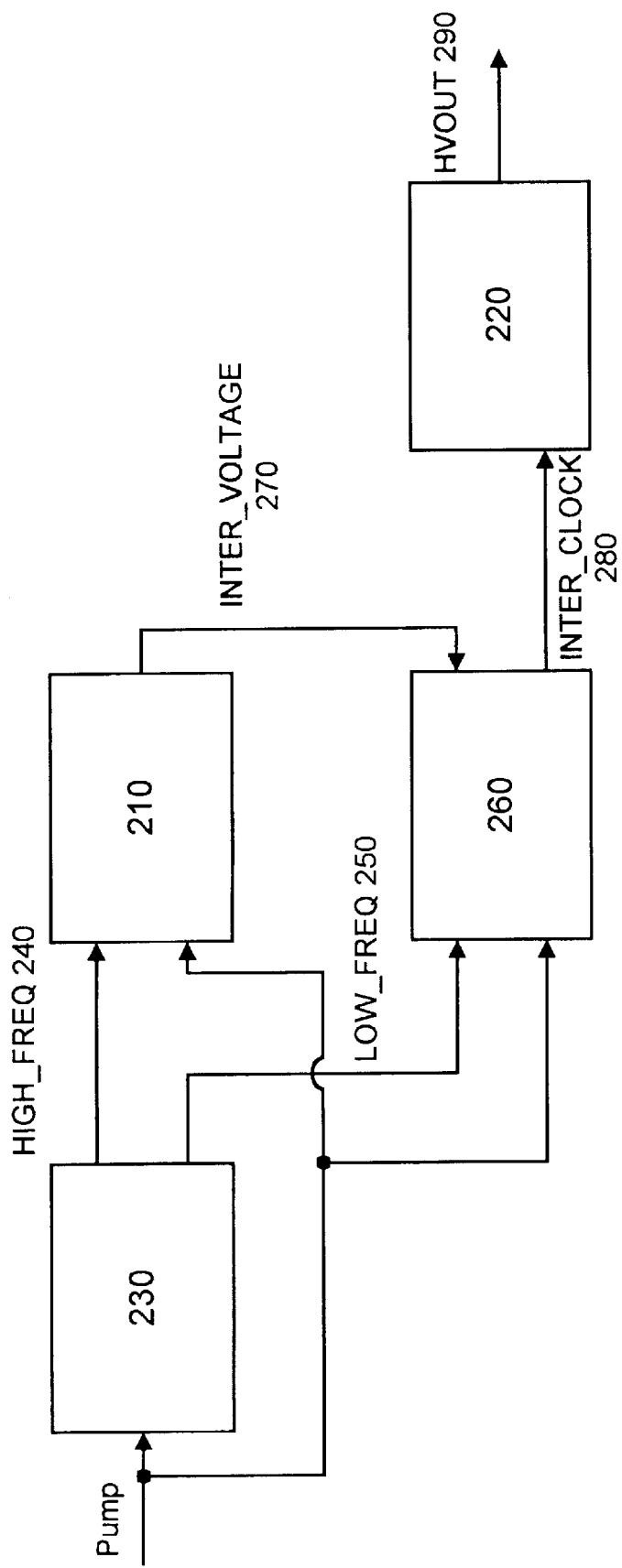
FIG._3

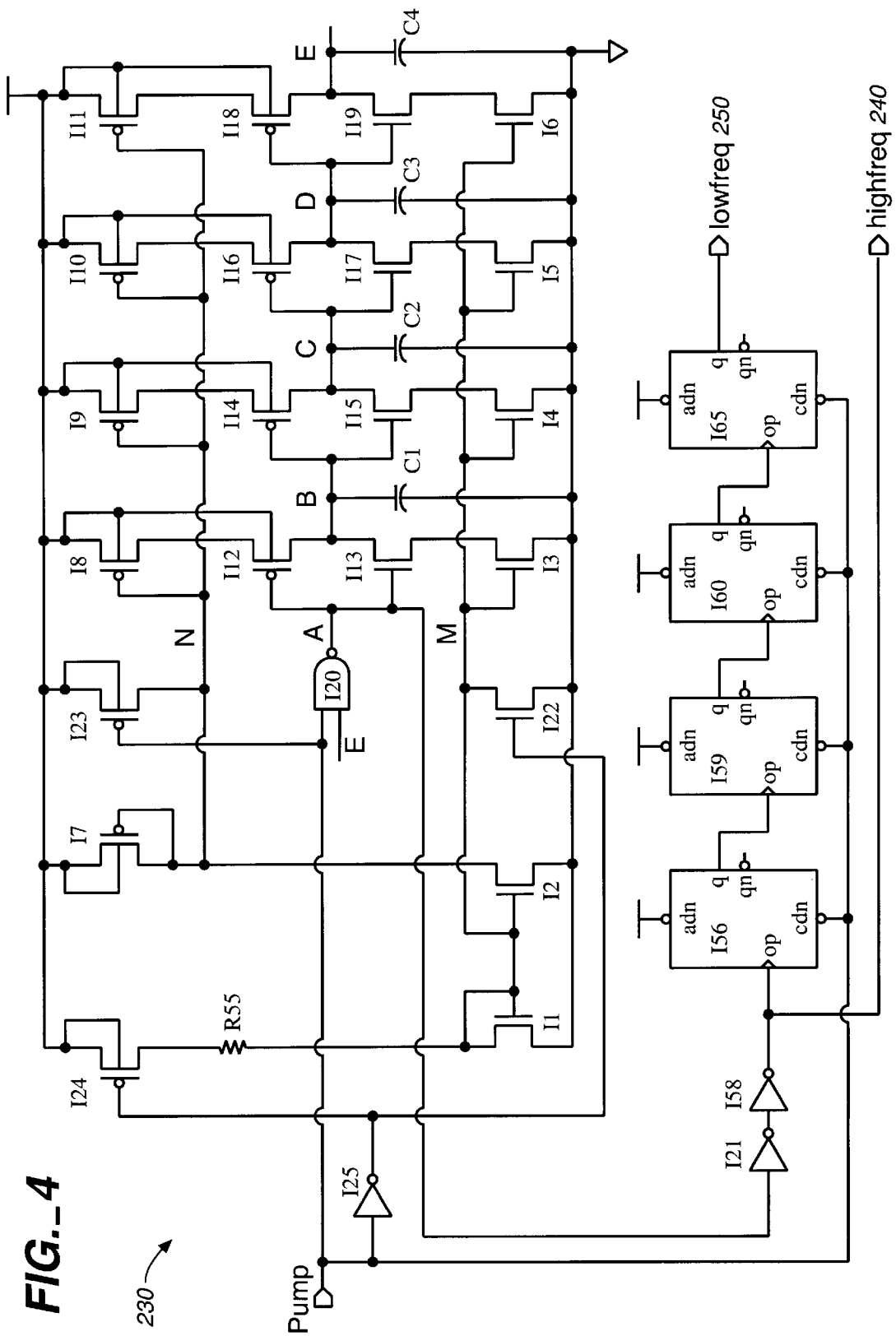
FIG._4

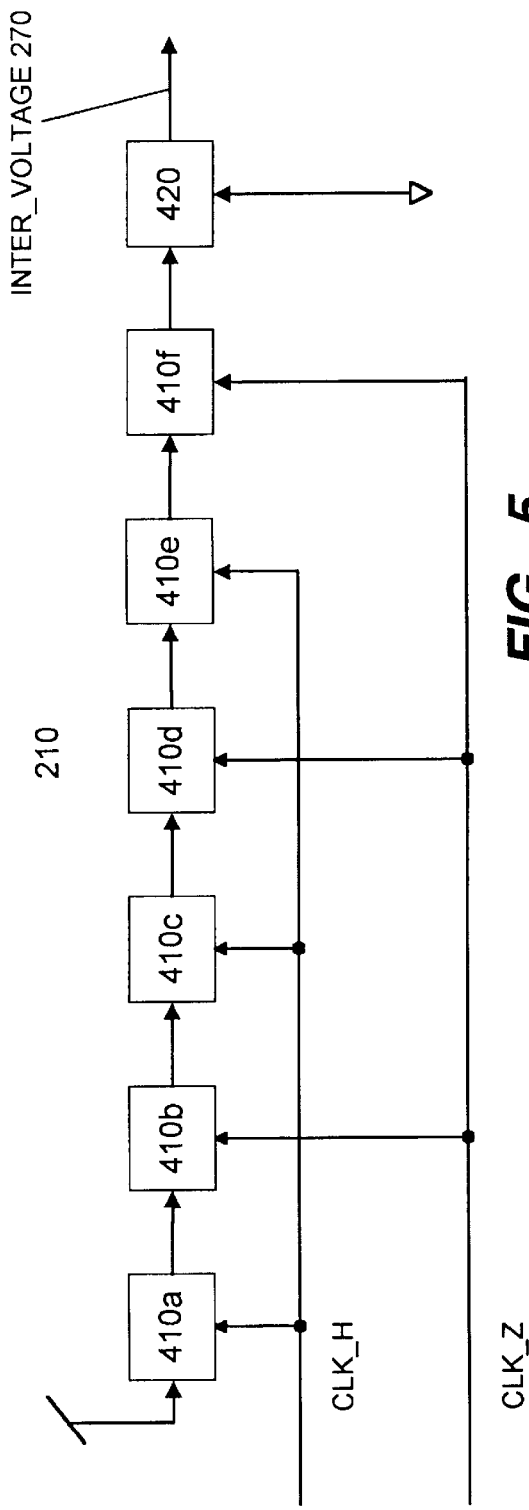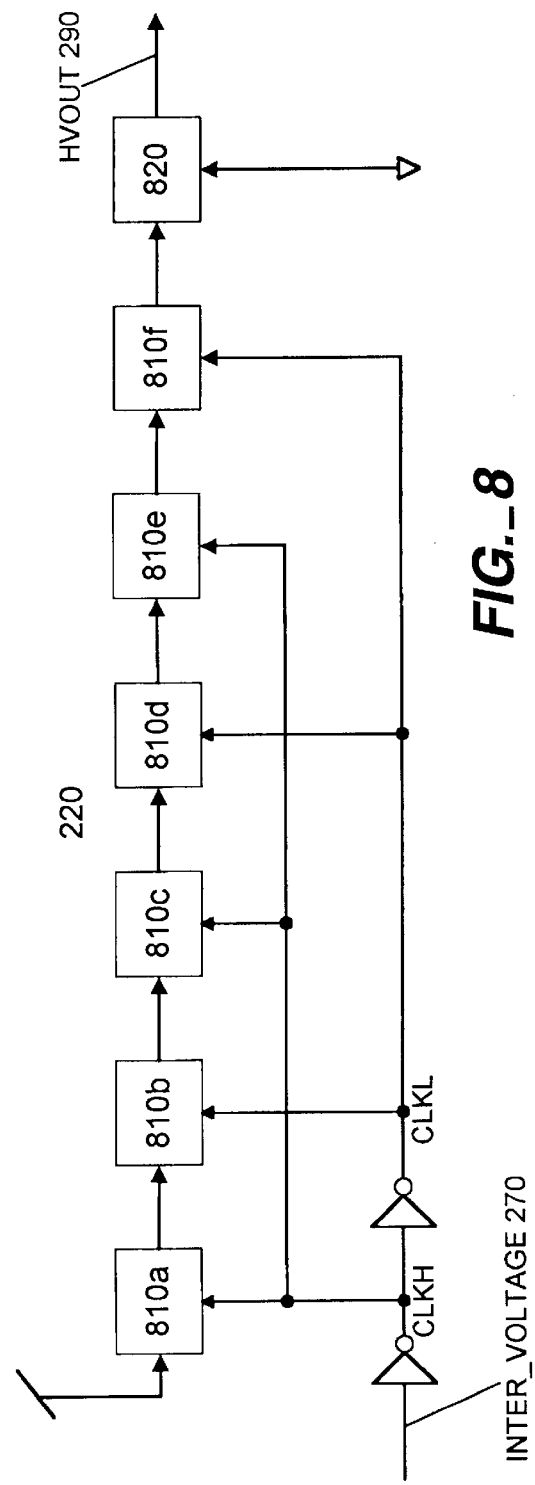
FIG._5
FIG._8

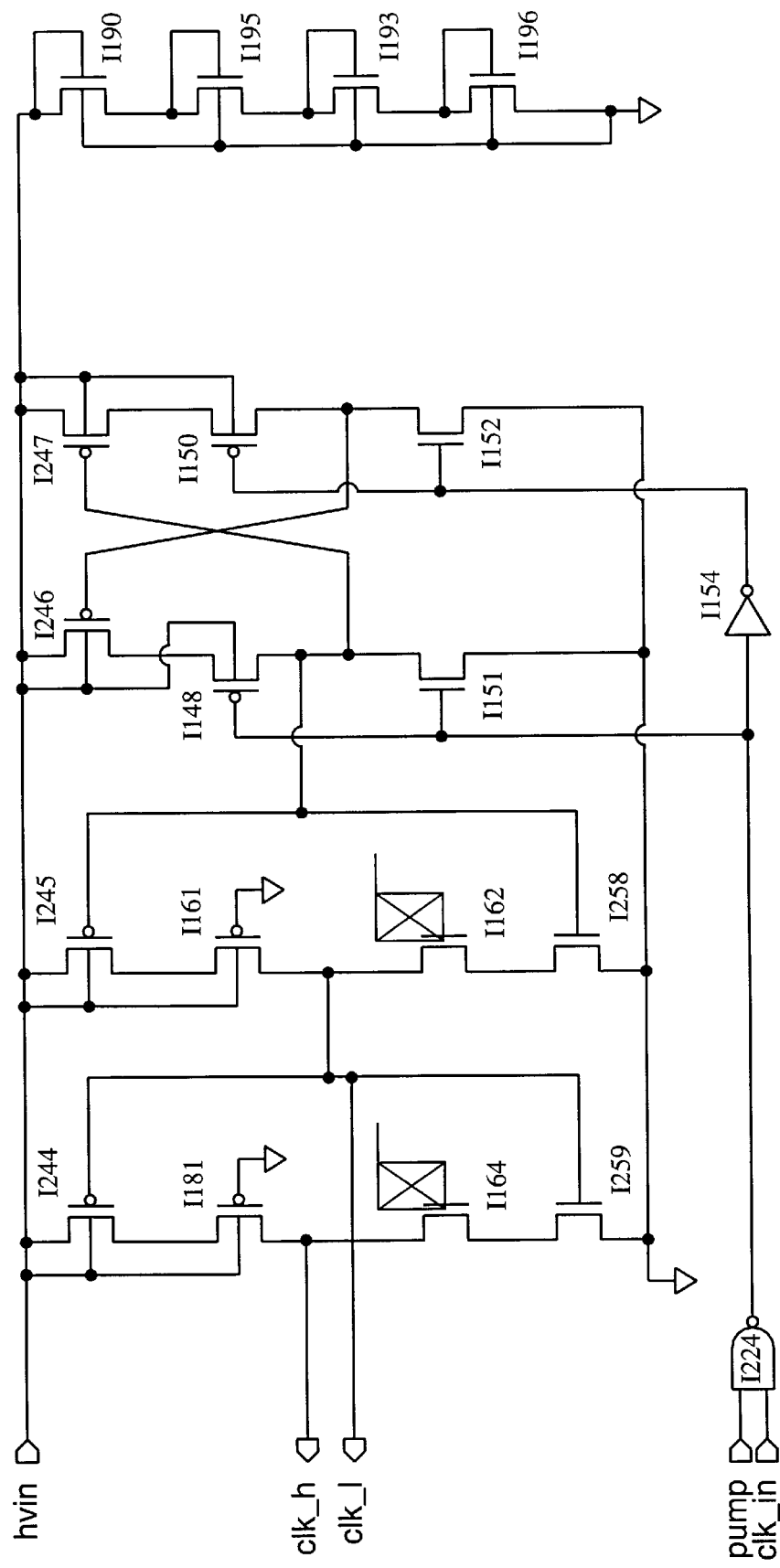
FIG._7

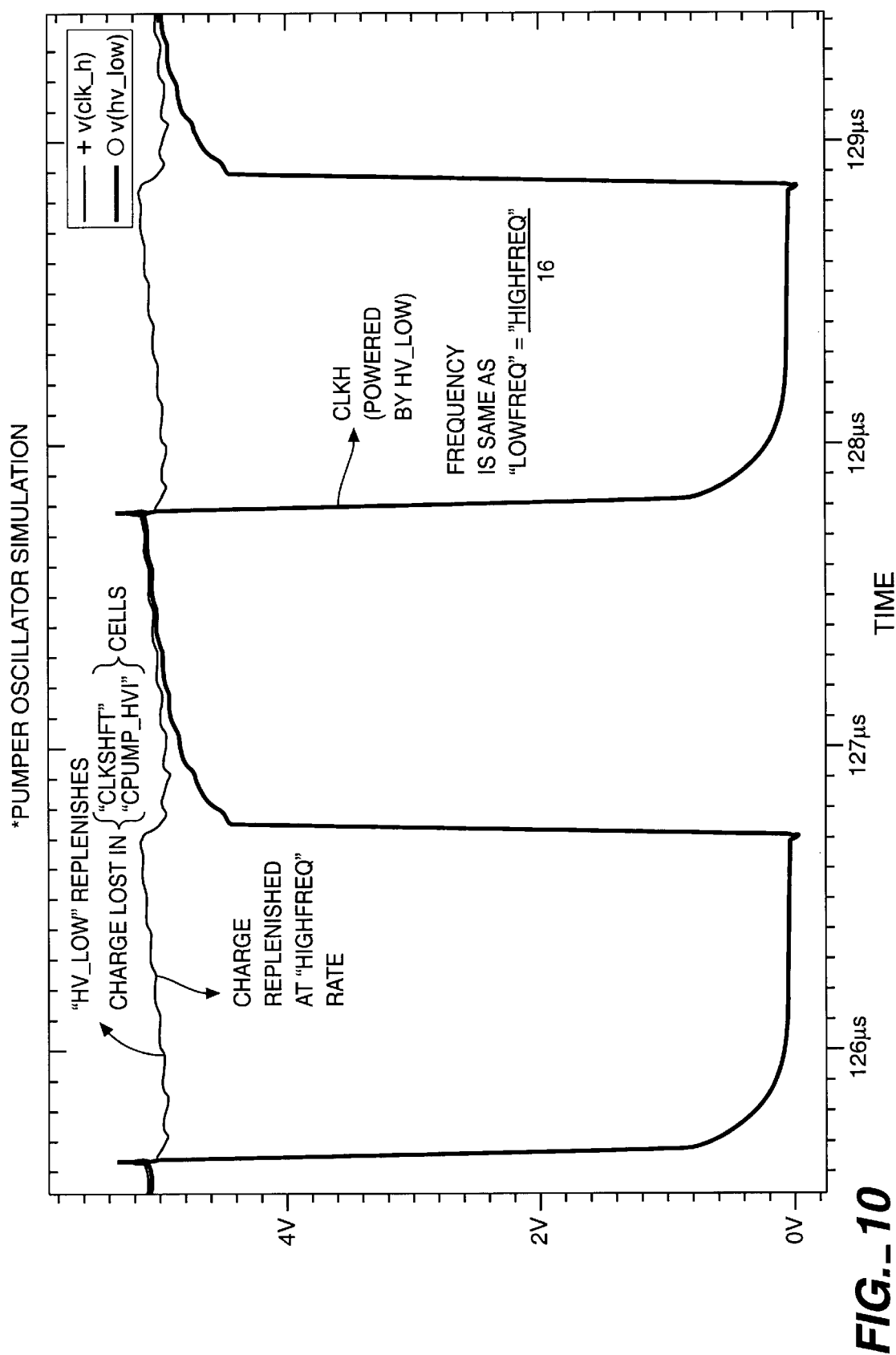
FIG._10

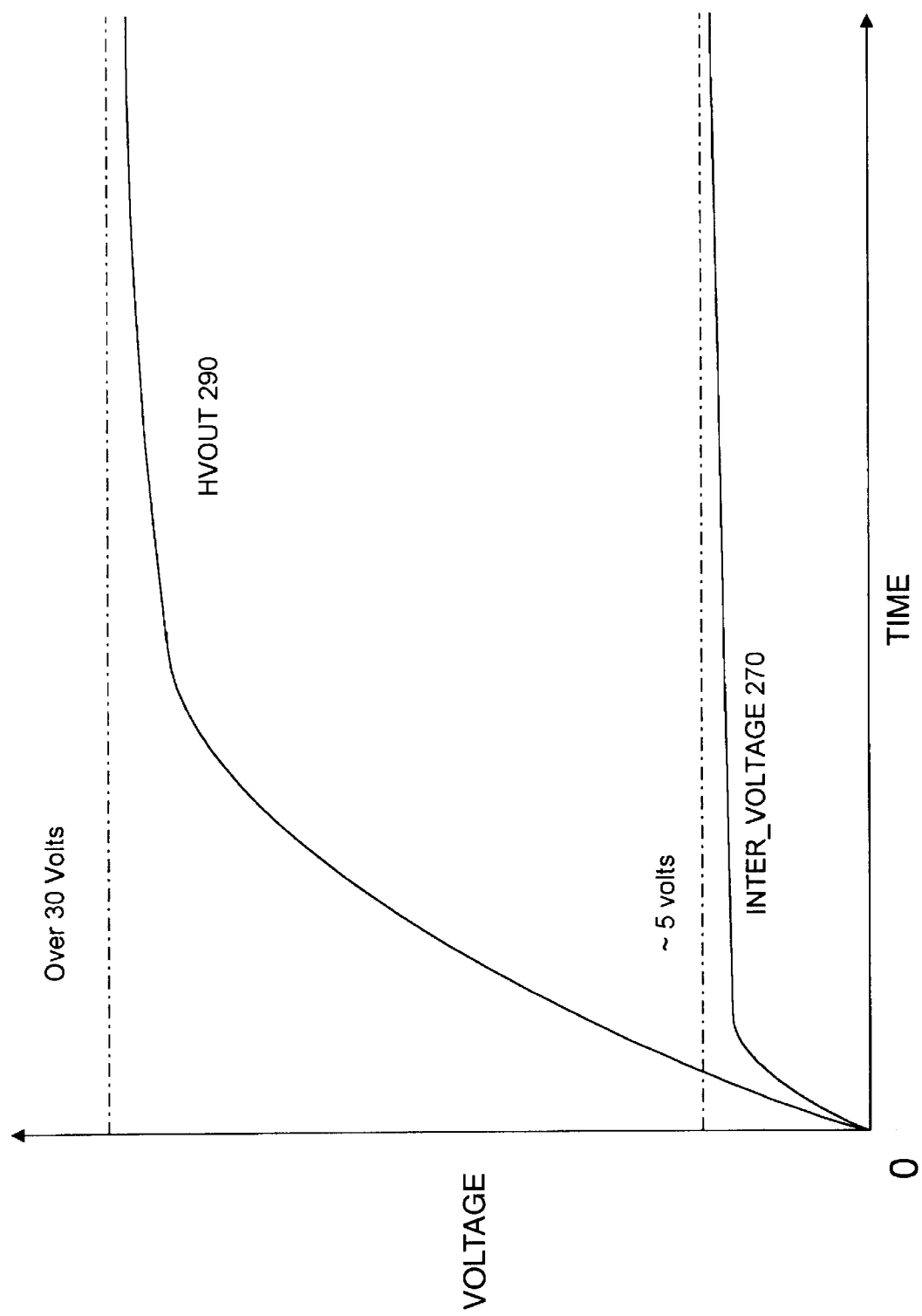
FIG._11

LOW VOLTAGE CHARGE PUMP CIRCUIT

BACKGROUND OF THE INVENTION

This invention relates to computer systems and, more particular, to methods and apparatus for providing high output voltage level with a low level input voltage by using charge pump circuitry.

A major trend in the manufacture of personal computers is toward portable computers which are able to provide most of the abilities of desktop computers. However, in order to accomplish this goal, such portable computers must provide large storage capacity and high processor speed necessary to run large programs. A typical prior art portable computer uses a great deal of power in order to meet these requirements.

At the same time, computer designers are modifying the components used in such portable computers so that the portable computers are able to run for long periods while consuming very small amounts of power. In order to reduce power consumption and extend battery life, much of the integrated circuitry used in portable computers is being redesigned to run at low voltage levels. This reduces the power usage and allows more components to be placed closer to one another in the circuitry. Currently, circuitry and components used in portable computers are being designed to operate at very low voltage levels such as 3.3 volts. However, due to continuous developments in this area, the next generation's portable computers are being designed to run at a voltage of less than 2.0 volts in order to further reduce the power consumptions.

However, at the same time, the desire to make portable computers offering all of the advantages of desktop computers opposes this salutary result. Many of the advantages offered by desktop computers require higher voltages in order to function. For example, one real convenience is the ability to change the BIOS processes as improvements in the computer or its peripherals occur. Historically, this has been accomplished by removing the electrical programmable read only memory (EPROM) for storing the BIOS processes and replacing it with new circuitry at additional cost. This is a complicated operation beyond the abilities of many computer users. Recently, electrically erasable programmable read only memory (EEPROM) has been used to store the BIOS processes in some newly designed portable computers. These computers run a small update program to reprogram the BIOS circuitry when the user changes the BIOS processes. However, reprogramming the EEPROM sometimes requires up to about fifteen to twenty volts to accomplish.

Another form of EEPROM array provides another example of high voltage requirements in portable computers. Recently, a new form of long term random access storage has been devised using EEPROM technologies. For example, an array of large capacity EEPROM may be used in place of a hard disk drive. This EEPROM array provides a smaller lighter functional equivalent of a hard disk drive which operates more rapidly and is not as sensitive to physical damage as the hard disk. Such memory arrays are especially useful in portable computers where space is at a premium and weight is extremely important. However, these EEPROM arrays also require much higher voltages for writing and erasing of data.

In the process of writing and erasing of data in the EEPROM, it is well known in the art that a voltage regulator is needed to supply the high voltage level. In the integrated circuit environment, usually a charge pump circuitry is employed as the voltage regulator to provide the high voltage level.

Experimental results have shown that the speed of the writing and erasing of data in the EEPROM is directly related to the supplied voltage level. The higher the supplied voltage level, the faster the writing and erasing of data in the EEPROM. Therefore, the designers have been continuously working to increase the voltage output level from the voltage regulator.

In addition, in order to satisfy most system requirements, the charge pump circuitry must be able to supply unregulated voltages close to the breakdown of the process so that erase/write times will be in the few millisecond range. The prior art charge pump architecture requires that a minimum VDD level of about 3.0 volts be used to provide this high voltage. Unfortunately, due to the continuous need of reducing the power consumption, the marketplace is demanding the next generation charge pump circuitry to work with VDD levels in the 2.0 volts range because of the concern of the overall power consumption and system performance.

The conventional approach used for creating the high voltage level is based upon a classic diode scheme using NMOS FETs. The circuitry is shown on FIGS. 1–2 and consists of several individual diode pump units 10a, 10b . . . connected in series to form a serial diode pump chain 20. Each of the diode pump units is composed of a NMOS FET 110 and a capacitor 120 as shown in FIG. 2. The drain and the gate of each of the NMOS FET 110 are connected together as shown in FIG. 2 wherein the resulting NMOS FET 110 works in a diode-like manner such that the current is cramped to flow only in one direction (i.e. from drain to source). Therefore, at the end of each clock cycle, the charges in each of the diode pump units are forced to be accumulated in the capacitor 120. In the illustrated example, there are 22 active diode pump units 10a, 10b, . . . and 1 holding stage 30. This diode pump chain has the VDD as its input along with clock signals (CLKB 40, CLKZ 50) which are the inverse of each other and transition from VDD to GND. The holding stage 30 isolates the output voltage from the clock signals and maintains the output voltage steady.

Before the details of the pumper are explained, it is necessary to define some terms. VDD is the chip supply voltage, Vt is the threshold of the NMOS devices, and Vsbnx is the source body effect of the Xth NMOS device and is a function of the voltage on the node (N1 or N2 . . . Nx).

The basic operation of the charge pump chain 20 is such that when CLKB 40 is at GND, the node N1 is charged to ~(VDD−Vt−Vsbn1). After node N1 is charged to this value, the CLKB 40 signal rises to a VDD level and causes N1 to boost to ~(2VDD−Vt−Vsbn1). During this boost time, CLKZ 50 is at GND and part of the voltage created at N1 is passed to node N2. Specifically, node N2 will charge up to ~2(VDD−Vt)−Vsbn1−Vsbn2. Now, CLKB 40 goes back to GND while CLKZ 50 rises to a VDD. This causes node N2 to rise and subsequently forces node N3 to a higher value consistent with the charge/boost terms noted above. This charge/boost process continues up the chain causing each node (Nx) to be a higher level than the previous nodes until the HVOUT node reaches the voltage desired.

The problem facing this basic approach is that the Vsbnx term is a function of the nodal location (N1, N2, . . . etc.) within the charge pump chain. The Vsbnx of the higher nodes (i.e., N21) is significantly higher than the Vsb value for N1. In order for the charge pump circuitry to operate and not become current starved, it is necessary that the following relationship be satisfied:

$$VDD > Vt + Vsbnx$$

Since Vt is fixed and Vsbnx varies by location, it is clear that the inequality may not be satisfied if VDD is too low or there are too many diode pump stages.

The conventional design architecture (using a VDD level of 2.0 volts) is theoretically limited (as per the equation above) to providing only 17.5 volts before the charge pump current starves (inequality not satisfied) and ceases operation. In reality, there are losses in circuits that interfaces with this charge pump that require VDD to be higher than this 2.0 volts. In fact, the existing design requires a minimum VDD level of close to 2.6 volts.

SUMMARY OF THE INVENTION

It is, therefore, an object of the present invention to provide an improved charge pump circuitry by which various circuit operations requiring high voltage may be carried out using integrated circuitry which is designed for low voltage operations.

It is another object of the present invention to provide an improved charge pump circuitry for generating high voltages for writing and erasing of data in an EEPROM in a computer system designed for low voltage usage.

These and other objects of the present invention are realized in the present invention which includes a conventional charge pump circuitry divided into separate sections of sub charge pump circuitry. Each of these separate sections is driven by an individual pump clock having different voltage level and different frequency.

It is important to point out that the novel design of a level shifter circuit is used in the present invention to provide a separate and higher voltage pump clock for the subsequent section of the sub charge pump circuitry. The advantage of this design is the ability to avoid the abovementioned limitations caused by the Vsbnx occurred in the higher nodes.

These and other objects and features of the invention will be better understood by reference to the detailed description which follows taken together with the drawings in which like elements are referred to by like designations throughout the several views.

BRIEF DESCRIPTION OF THE DRAWINGS

FIG. 1 illustrates a prior art design of a charge pump circuitry;

FIG. 2 illustrates the schematic diagram for a diode pump used in the charge pump circuitry;

FIG. 3 illustrates a two sections charge pump circuitry in accordance with the present invention;

FIG. 4 illustrates a pumper oscillator in accordance with the present invention;

FIG. 5 illustrates a schematic diagram for a low voltage pumper circuit in accordance with the present invention;

FIG. 6 illustrates a diode pump unit used in the low voltage pumper circuit in accordance with the present invention;

FIG. 7 illustrates a schematic diagram for a clock voltage shifter circuit in accordance with the present invention;

FIG. 8 illustrates the schematic diagram for a high voltage charge pump chain in accordance with the present invention;

FIG. 9 illustrates a diode pump unit used in the high voltage pumper circuit in accordance with the present invention;

FIG. 10 is a simulation result showing an intermediate clock INTER_CLK and an intermediate voltage INTER_VOLTAGE;

FIG. 11 is a simulation result showing the intermediate voltage INTER_VOLTAGE and the output voltage of the charge pump circuitry.

DETAIL DESCRIPTION OF THE INVENTION

The present invention uses a split charge pump design that divides a conventional voltage pumper circuit into multiple sections. Each of the multiple voltage pumper sections is similar in design and construction, but driven by a separate and distinct clock that (1) switches at a different speed, and (2) transitions between a different voltage range. The clock provided to each subsequent pumper section switches at a slower speed than the clock provided to the preceding pumper section in order to allow the subsequent pumper section to replenish the charges lost during the voltage amplification process. In addition, to reduce the source body effect of the higher nodes in the subsequent pumper section, each of the subsequent pumper sections is provided with a clock having a higher high voltage level than the preceding pumper section.

FIG. 3 shows the charge pumper configuration of the preferred embodiment of the present invention. In the preferred embodiment, the new charge pump circuitry comprises two sections: a low voltage pumper circuit CPUMP_LV1 210 and a high voltage pumper circuit CPUMP_HV1 220. It should be pointed out that the number of pumper sections of the charge pump circuitry is not limited to two as exemplified by the preferred embodiment as shown in FIG. 1. Multiple pumper sections (i.e. >2) can be coupled in series when higher voltage amplification is required.

In the preferred embodiment as shown in FIG. 3, a pumper oscillator PMPOSC_1 230 is provided for generating two clocks running at different frequencies (i.e. HIGH_FREQ 240 and LOW_FREQ 250). The HIGH_FREQ 240 clock provides the timing signal for the low voltage pumper circuit CPUMP_LV1 210 whereas the LOW_FREQ 250 clock provides the timing signal for the high voltage pumper circuit CPUMP_HV1 220. In the illustrated embodiment as shown in FIGS. 3–9, the LOW_FREQ 250 clock is running at a factor of 16 slower than the HIGH_FREQ 240 clock. It is important to point out the need for these two clocks of running in two different frequencies. The reason of supplying the low voltage pumper circuit CPUMP_LV1 210 with a pumper clock having a higher frequency than the high voltage pumper circuit CPUMP_HV1 220 is to provide the low voltage pumper circuit CPUMP_LV1 210 the ability to replenish the lost charges in the voltage conversion process. Even though the low voltage pumper circuit CPUMP_LV1 210 is very efficient, the efficiencies of high voltage pumper circuit CPUMP_HV1 220 and clock level shifter circuit CLK-SHFT 260 are not, and charges must be replenished at a faster rate than it is "lost" in order to ultimately pump the low VDD voltage to an acceptable higher level.

As shown in FIG. 3, the low voltage pumper circuit CPUMP_LV1 210 is driven by the HIGH_FREQ 240 clock which switches between VDD and GND levels. In the exemplary embodiment as shown in FIG. 5, the low voltage pumper circuit CPUMP_LV1 210 has 6 active diode pump stages 410a, 410b, . . . and a final holding stage 420 to hold the output of the intermediate voltage INTER_VOLTAGE 270. The low voltage pumper circuit CPUMP_LV1 210 takes a 2.0 volt VDD level and increases it to the intermediate voltage INTER_VOLTAGE 270 of a minimum of 5.0 volts. With this number of stages (e.g. 6), the low voltage pumper circuit CPUMP_LV1 210 can easily supply this ~5.0 volts level output without concern of the limiting effects of Vsbnx. Note that the number of the diode pump units is not limited to any number. The number of diode pump units can be increased or decreased depending on the system and performance requirements of the overall circuitry.

In the preferred embodiment, the clock level shifter circuit CLKSHFT 260 raises the high voltage level of the LOW_FREQ 250 clock from VDD to the intermediate voltage INTER_VOLTAGE 270. By combining the intermediate voltage INTER_VOLTAGE 270 with the LOW_FREQ 250 clock, the clock level shifter circuit CLKSHFT 260 generates an intermediate clock INTER_CLK 280 running at the same speed as the LOW_FREQ 250 clock but having a voltage transition from the intermediate voltage INTER_VOLTAGE 270 to GND.

The intermediate clock INTER_CLK 280 outputted from the CLKSHFT is then used as the clock signal to drive the high voltage pumper circuit CPUMP_HV1 220. The high voltage pumper circuit CPUMP HV1 220 is quite similar in its construction to the low voltage pumper circuit CPUMP_LV1 210 which includes a plurality of diode pump units connected in series. In this embodiment, 6 diode pump units are connected in series to generate the desired output voltage (>30 volts). However, as discussed before, the number of diode pump units used in either section depends upon the design choices based on the overall system performance. The fact that the intermediate clock INTER_CLK 280 is switching between the intermediate voltage INTER_VOLTAGE 270(i.e. ~5.0 volts) and GND provides enough voltage margin so that the Vsbnx term is no longer a factor in limiting the output voltage of the high voltage pumper circuit CPUMP_HV1 220 to an acceptable high level. In fact, with a ~5.0 volt clock input, the high voltage pumper circuit CPUMP_HV1 220 could easily supply output voltages HVOUT 290 in excess of 30 volts or more. However, the breakdown of the process will be reached before that level.

FIG. 4 shows a schematic diagram of the pumper oscillator PMPOSC_1 230. As discussed before, it is important for the pumper oscillator PMPOSC_1 230 to generate multiple clocks having different frequencies. The faster HIGH_FREQ 240 clock is used to provide the timing for the low voltage pumper circuit CPUMP_LV1 210 to generate the intermediate voltage INTER_VOLTAGE 270 from VDD. On the other hand, the slower LOW_FREQ 250 clock is used to provide the timing for the clock level shifter circuit CLKSHFT 260 to generate the intermediate clock INTER_CLK 280 having the voltage transition from the intermediate voltage INTER_VOLTAGE 270 to GND. As discussed in the previous paragraph, the LOW_FREQ 250 clock is specifically designed to run at a slower frequency than the HIGH_FREQ 240 clock in order to provide the low voltage pumper circuit CPUMP_LV1 210 the ability to replenish the charge lost during the voltage conversion process. It should be emphasized that the 16× relationship between the higher and lower frequencies as chosen for the present embodiment is for illustration purposes only. The important point for the present invention is that there are two separate frequencies provided to the two separate pumper sections of the charge pumper circuitry.

FIG. 5 shows the schematic diagram of the low voltage pumper circuit CPUMP_LV1 210. The low voltage pumper circuit CPUMP_LV1 210 is composed of a plurality of the diode pump units 410a, 410b, . . . connected in series. The design of a single section diode pump chain is well known in the art and is used similarly in the conventional charge pump circuitry.

The low voltage pumper circuit CPUMP_LV1 210 is designed to raise the voltage from VDD to the intermediate voltage INTER_VOLTAGE 270. In this preferred embodiment, the intermediate voltage INTER_VOLTAGE 270 is around 5.0 volts. As discussed in the previous paragraph, the intermediate voltage INTER_VOLTAGE 270 level can be adjusted by changing the number of the diode pump units in the low voltage pumper circuit CPUMP_LV1 210.

FIG. 6 shows a schematic diagram of the diode pump unit used in the low voltage pumper circuit CPUMP_LV1 210. The construction of the diode pump unit is similar to the diode pump unit used in the conventional charge pump circuitry.

FIG. 7 shows a schematic diagram of the clock level shifter circuit CLKSHFT 260 for the present invention. The clock level shifter circuit CLKSHFT 260 generates the intermediate clock INTER_CLK 280 by shifting the high voltage level of the LOW_FREQ 250 clock from VDD to the intermediate voltage INTER_VOLTAGE 270 (i.e. around 5.0 volts). The resulting intermediate clock INTER_CLK 280 has the same frequency as the LOW_FREQ 250 clock but has a higher high voltage level of around 5.0 volts comparing to the high voltage level of around VDD of the LOW_FREQ 250 clock. The intermediate clock INTER_CLK 280 is then supplied to the high voltage pumper circuit CPUMP_HV1 220.

FIG. 8 shows a schematic diagram of the high voltage pumper circuit CPUMP_HV1 220 of an embodiment of the present invention. The construction of the high voltage pumper circuit CPUMP_HV1 220 is similar to the one used in both the low voltage pumper circuit and the conventional charge pump circuitry. As discussed in the previous paragraphs on the low voltage pumper circuit CPUMP_LV1 230, the high voltage pumper circuit CPUMP_HV1 220 is composed of a plurality of the diode pump units connected in series. As similar to the low voltage pumper circuit CPUMP_LV1 210, the number of the stages of the diode pump can be adjusted depending on the system requirements. In the present embodiment, 6 diode pump units are used for the pumping of the voltage. In addition, a holding circuit is located at the last stage as the high voltage holding circuit. It should be pointed out that, for this embodiment, the voltage is pumped from VDD (i.e. input voltage supplied to the first diode pump unit) to the high output voltage in the stage of the high voltage pumper circuit whereas in the next embodiment the voltage is pumped from the intermediate voltage to the final output voltage in the high voltage pumper circuit CPUMP_HV1 220.

In the high voltage pumper circuit CPUMP_HV1 220 of another embodiment of the present invention, the CPUMP_HV1 220 is also provided with the intermediate voltage INTER_VOLTAGE 270 (i.e. output voltage from the low voltage pumper circuit) for use as the input for the first diode pump unit of the CPUMP_HV1 220 (i.e. VDD*). Because of the increase of the input voltage from VDD to VDD*, the overall charge pump circuitry can more quickly produce the same high output voltage HVOUT 290 with potentially fewer stages of diode pump units.

FIG. 9 shows a schematic diagram of a diode pump unit used in the high voltage pumper circuit CPUMP_HV1 220. The construction of this diode pump unit is similar to the diode pump unit used in the conventional charge pump circuit and the low voltage pumper circuit CPUMP_LV1 210. However, due to the various requirements needed for different sections of the charge pumper circuit, the design parameters such as numbers of diode pump units in each section, NMOS design parameters, and capacitor values, etc. can be different in the low voltage pumper circuit CPUMP_LV1 210 and the high voltage pumper circuit CPUMP_HV1 220.

Simulation results of this preferred embodiment are shown in FIGS. 10–11. The simulation was performed under the following conditions (i.e. one of the "worst" case conditions): VDD=2.0 volts; Temp=−40 Deg C.; & Process= "slow".

FIG. 10 shows the simulation results of (1) the intermediate voltage INTER_VOLTAGE 270 outputted from the low voltage pumper circuit CPUMP_LV1 210, and (2) the intermediate clock INTER_CLK 280 outputted from the clock level shifter circuit CLKSHFT 260. As shown in the diagram, the high voltage level of the intermediate clock INTER_CLK 280 generated by the clock level shifter circuit CLKSHFT 260 is stabilized to around 5.0 volts—shifted from 2.0 volts of the high voltage of the clock provided to the clock level shifter circuit. It is also shown in the simulated result that the speed (or frequency) of the intermediate clock INTER_CLK 280 is identical to the speed of the LOW_FREQ 250 clock provided to the clock level shifter circuit.

FIG. 11 shows the output HVOUT 290 of the high voltage pumper circuit CPUMP_HV1 220. The voltage output is over 18 volts which can never be achieved by the conventional single stage pumper circuit. The intermediate voltage INTER_VOLTAGE 270 is stabled to around 5.0 volts as predicted by the analysis.

From the foregoing detailed description, therefore, it can be seen that the present invention provides an improved charge pump circuitry for generating and supplying a regulated positive potential of exceeding 30 volts from a low level input voltage of about 2.0 volts. By splitting the charge pump circuitry into multiple sections, the present invention can be implemented in the conventional integrated circuit technologies to provide a high output voltage (i.e. over 30 volts) from a low input voltage (2.0 volts).

It is understood that while the invention has been described above in conjunction with preferred specific embodiments, the description and examples are intended to illustrate and not limit the scope of the invention, which is defined by the scope of the appended claims.

What is claimed is:

1. A voltage converter circuit for converting a low input voltage to a high output voltage, comprising:
   a pumper oscillator;
   a first pumper circuit coupled to said pumper oscillator for converting said low input voltage to an intermediate voltage;
   a level shifter circuit coupled to said first pumper circuit for generating an intermediate clock switching between a high voltage level and a ground voltage level, wherein said high voltage level is approximately equal to said intermediate voltage; and
   a second pumper circuit coupled to said level shifter circuit for generating said high output voltage.

2. The voltage converter circuit as recited in claim 1, wherein said pumper oscillator provides a high frequency clock for said first pumper circuit, said high frequency clock having a higher frequency than said intermediate clock.

3. The voltage converter circuit as recited in claim 2, wherein said high frequency clock runs at about 16 times of the speed of said intermediate clock.

4. The voltage converter circuit as recited in claim 1, wherein said first pumper circuit comprises a first plurality of diode pump units connected in series.

5. The voltage converter circuit as recited in claim 1, wherein said second pumper circuit comprises a second plurality of diode pump units connected in series.

6. The voltage converter circuit as recited in claim 5, wherein said second pumper circuit is provided with said low input voltage, said second pumper circuit amplifying said low input voltage to said high output voltage.

7. The voltage converter circuit as recited in claim 5, wherein said second pumper circuit is provided with said intermediate voltage, said second pumper circuit amplifying said intermediate voltage to said high output voltage.

8. The voltage converter circuit as recited in claim 1, wherein said pump oscillator generates two clock signals.

9. The voltage converter circuit as recited in claim 8, wherein said two clock signals comprises a low frequency clock and a high frequency clock.

10. The voltage converter circuit as recited in claim 9, wherein said high frequency clock is running at about 16 times of the speed of said low frequency clock.

11. The voltage converter circuit as recited in claim 9, wherein said pumper oscillator provides said high frequency clock to said first pumper circuit, and said pumper oscillator provides said low frequency clock to said second pump circuit.

12. The voltage converter circuit as recited in claim 1, wherein said ground voltage level is 0 volt.

13. The voltage converter circuit as recited in claim 1, wherein said low level voltage is not greater than 2 volts.

14. The voltage converter circuit as recited in claim 1, wherein said intermediate voltage is approximately 5 volts.

15. The voltage converter circuit as recited in claim 1, wherein said high output voltage is greater than 20 volts.

16. The voltage converter circuit as recited in claim 15, wherein said high output voltage is greater than 30 volts.

17. A method of converting a low input voltage to a high output voltage, comprising the steps of:
   providing a high frequency clock switching between said low input voltage and a ground voltage level to a first voltage converter;
   converting, by said first voltage converter, said high frequency clock to an intermediate clock switching between an intermediate voltage and a ground voltage level, wherein said intermediate voltage is higher than said input voltage;
   providing said intermediate clock to a second voltage converter; and
   generating said high output voltage by said second voltage converter.

18. The method of converting voltage as recited in claim 17, wherein said first voltage converter comprises a first pumper circuit, and said second voltage converter comprises a second pumper circuit.

19. The method of converting voltage as recited in claim 17, wherein said first pumper circuit comprises a first plurality of diode pump units connected in series, and said second pumper circuit comprises a second plurality of diode pump units.

20. The method as recited in claim 18, wherein said second pumper circuit is provided with said low input voltage, said second pumper circuit amplifying said low input voltage to said high output voltage.

21. The method as recited in claim 18, wherein said second pumper circuit is provided with said intermediate voltage, said second pumper circuit amplifying said intermediate voltage to said high output voltage.

22. The method of converting voltage as recited in claim 17, wherein said first voltage converter comprises a level shifter, said level shifter generating said intermediate clock.

23. The method of converting voltage as recited in claim 17, wherein said intermediate clock is running at a speed slower than said high frequency clock.

24. The method of converting voltage as recited in claim 17, wherein said intermediate clock is running at a speed of about 16 times of said low frequency clock.

25. The method of converting voltage as recited in claim 17, wherein said ground voltage level is 0 volt.

26. The method of converting voltage as recited in claim 17, wherein said low input voltage is not greater than 2 volts.

27. The method of converting voltage as recited in claim 17, wherein said intermediate voltage is approximately 5 volts.

28. The method of converting voltage as recited in claim 17, wherein said high output voltage is greater than 20 volts.

29. The method of converting voltage as recited in claim 27, wherein said high output voltage is greater than 30 volts.

30. A voltage converter for converting a low input voltage to a high output voltage, comprising:
   a first voltage converter for converting said low input voltage to an intermediate clock switching between an intermediate voltage and a ground voltage level, wherein said intermediate voltage is higher than said low input voltage; and
   a second voltage converter coupled to said first level voltage converter for generating said high output voltage.

31. The voltage converter as recited in claim 30, wherein said first voltage converter comprises a first charge pump circuit, and said second voltage converter comprises a second charge pump circuit.

32. The voltage converter as recited in claim 31, wherein said second pumper circuit is provided with said low input voltage, said second pumper circuit amplifying said low input voltage to said high output voltage.

33. The voltage converter as recited in claim 21, wherein said second pumper circuit is provided with said input voltage, said second pumper circuit amplifying said intermediate voltage to said high output voltage.

34. The voltage converter as recited in claim 31, wherein said first charge pump circuit comprises a first plurality of diode pump units connected in series, and said second charge pump circuit comprises a second plurality of diode pump units connected in series.

35. The voltage converter as recited in claim 30, further comprising:
   a high frequency clock provided to said first voltage converter, said high frequency clock is running at a speed faster than said intermediate clock.

36. The voltage converter as recited in claim 35, wherein said high frequency clock is running at a speed of about 16 times of said intermediate clock.

37. The voltage converter as recited as claim 30, wherein said ground voltage level is 0 volt.

38. The voltage converter as recited in claim 30, wherein said low input voltage is not greater than 2 volts.

39. The voltage converter as recited in claim 30, wherein said intermediate voltage is approximately 5 volts.

40. The voltage converter as recited in claim 30, wherein said high output voltage is greater than 20 volts.

41. The voltage converter as recited in claim 39, wherein said high output voltage is greater than 30 volts.

42. A method for converting an input clock signal to an output clock signal, comprising the steps of:
   providing said input clock signal, wherein said input clock signal switches between a low voltage level and a ground voltage level; and
   amplifying said input clock signal to said output clock signal, wherein said output clock signal switches between a higher level voltage and said ground voltage level, said higher voltage level is higher than said low high voltage level, and said input clock signal runs faster than said output clock signal.

43. The method as recited in claim 42, wherein said input clock signal is provided by a first pumper circuit comprising a first plurality of diode pump units connected in series.

44. The method as recited in claim 43, wherein said output clock signal is provided for a second pumper circuit comprising a second plurality of diode pump units connected in series.

* * * * *